United States Patent [19]

Saunby

[11] 3,928,434
[45] Dec. 23, 1975

[54] OXIDATIVE REMOVAL OF IMPURITIES FROM ACETIC ACID

[75] Inventor: John Brian Saunby, South Charleston, W. Va.

[73] Assignee: Union Carbide Corporation, New York, N.Y.

[22] Filed: Apr. 2, 1973

[21] Appl. No.: 347,125

[52] U.S. Cl. ............................. 260/541; 260/533 R
[51] Int. Cl.² .......................................... C07C 51/42
[58] Field of Search ................. 260/541, 540, 533 R

[56] References Cited
UNITED STATES PATENTS

| | | | |
|---|---|---|---|
| 2,255,421 | 9/1941 | Grall et al. .......................... | 260/541 |
| 3,384,659 | 5/1968 | Bate .................................... | 260/541 |
| 3,432,544 | 3/1969 | Sennewald et al. ................. | 260/541 |
| 3,459,707 | 8/1969 | Hayden et al. ...................... | 260/541 |
| 3,488,383 | 1/1970 | Coffey ................................. | 260/541 |
| 3,560,560 | 2/1971 | Kiff ..................................... | 260/541 |

*Primary Examiner*—Vivian Garner
*Attorney, Agent, or Firm*—Charles J. Metz

[57] ABSTRACT

The content of oxidizable impurities in acetic acid is reduced by contacting acetic acid containing oxidizable impurities and a catalytic amount of a soluble transition metal compound with a gas containing molecular oxygen.

17 Claims, No Drawings

OXIDATIVE REMOVAL OF IMPURITIES FROM ACETIC ACID

The invention relates to a process for reducing the content of oxidizable impurities in acetic acid.

Acetic acid is an important article of commerce having many utilities. One of the most important methods for producing acetic acid is the liquid phase oxidation of low molecular weight hydrocarbons such as butane. The acetic acid produced by this process is of high quality in most respects, but it does contain trace impurities which restrict its use for some purposes. Among the trace impurities that are often present are alpha, beta-unsaturated ketones such as methyl vinyl ketone and methyl isopropenyl ketone, which cannot be readily removed by ordinary purification methods such as distillation. The combined amount of such readily oxidizable materials is usually in the range of from about 100 to about 300 parts by weight per million parts by weight of acetic acid ("ppm")

The alpha, beta-unsaturated ketones can be detected by vapor phase chromatography, but a more common method of detecting their presence is a test known as the potassium permanganate time test. In this test, exactly 2 milliliters of the acid containing trace amounts of the unsaturated ketones is mixed with 10 milliliters of distilled water and exactly 0.1 milliliter of 0.1N aqueous potassium permanganate. The mixture is allowed to stand at room temperature, and the time is noted for the pink permanganate color to disappear completely. Acetic acid having a permanganate time test of at least 2 hours is generally acceptable for any commercial use.

The permanganate time test is not solely for the detection of unsaturated ketones, but rather it will detect all of the oxidizable impurities that are contained in the acetic acid. For instance, there are often some formic acid and trace amounts of acetaldehyde present. Both of these react with permanganate, as do other oxidizable compounds. Nevertheless, the unsaturated ketones are the most reactive, and they must be virtually completely removed before the acid will meet the permanganate time test requirement of at least two hours.

Various methods have been proposed for the removal of the oxidizable impurities. Hydrogenation over a precious metal catalyst converts the unsaturated ketones to inoffensive saturated alcohols. Also, the oxidizable impurities can be destroyed by reaction with ozone. Reaction with hydrogen peroxide at elevated temperature is also fairly effective. However, all of these methods have some drawbacks. While hydrogenation produces acceptable quality acetic acid, the process requires substantial investment in processing equipment and employs a very costly catalyst. A source of hydrogen must be present, and if byproduct hydrogen is not available, some means of making it must be provided. Ozone generating equipment is expensive, and there is a certain element of risk involved in handling ozone at elevated temperatures in organic liquids. Treatment of the acetic acid with hydrogen peroxide also involves some hazards when it is done on a large scale.

The present invention is based upon the discovery that the content of oxidizable impurities in acetic acid can be reduced to an acceptable level by a process which comprises contacting acetic acid containing such impurities and a catalytically effective amount of a soluble transition metal compound, with a gas containing molecular oxygen, at an elevated temperature and for a period of time sufficient to reduce the content of oxidizable impurities to a level wherein the acetic acid product of this process has a rating of at least 2 hours in the afore-described potassium permanganate time test.

The process of the invention can be carried out as a batch operation or as a continuous process. When being carried out as a batch operation, the acid containing the impurities and catalyst are charged to a reactor and heated to the desired elevated temperature. The gas containing oxygen is passed through the liquid while it is stirred to provide good mixing. After the desired reaction period, the liquid is cooled and discharged. When the process is carried out as a continuous process, the catalyst is dissolved in the acetic acid which is to be treated. The acid containing the catalyst is fed to a reaction vessel at a steady rate, and it is allowed to flow out at the rate it is fed so that a known residence time is attained. The oxygen containing gas is passed through the liquid in the reaction vessel, while said liquid is maintained at the desired reaction temperature. The product is collected as it emerges from the reactor.

When the process is carried out as a continuous process, it is often advantageous to use a series of reactors. In such an arrangement the acetic acid containing the catalyst is fed to an initial reactor from which it overflows to a second, and thence to a third, and even a fourth, if desired. Oxygen containing gas is fed independently to each reactor. Liquid-gas contact may be effected by mechanical agitation, or, the gas may be admitted at such a rate that it supplies an adequate rate of mixing. In this case, the reactors may be long tubes or bundles of tubes, with a relatively high length to diameter ratio. For instance, suitable length to diameter ratios can be found within the range of from about 3:1 to about 40:1, and preferable from about 5:1 to about 15:1. The liquid may be fed at the top of the tubes, and the gas at the bottom, or if desired, both may be fed at the bottom and the turbulence developed by mixing in this manner can supply the required agitation.

Elevated temperatures are employed for the reaction. With a prolonged contact time, the process is effective to reduce the content of impurities to an acceptable level at temperatures as low as about 75°C. Above 150°C. there may be some loss of efficiency owing to formation of acetone by decarboxylation of the acetic acid. Therefore, the broad limits of the desirable temperature for carrying out the process are from about 75° to about 150°C., with a temperature range of from about 110° to about 140°C. being preferred.

The total contact time of the acid and the oxygen containing gas is long enough to reduce the content of the oxidizable impurities to a level wherein the acetic acid product of the process has a rating of at least 2 hours in the potassium permanganate time test. This actual reaction time can vary, depending upon the temperature and the efficiency or effectiveness of the gas-liquid contact. While at high temperature and under very good gas-liquid contacting conditions, a total contact time as short as about 20 minutes may be employed in some cases. In others, the minimum contact time required might be as long as 1½ hours and even longer. Generally, when the above-mentioned preferred temperature range is employed, the contact time required will be from about 30 minutes to about 60 minutes in order to attain at least a 2 hour rating in the permanganate time test.

The oxygen containing gas that is employed in the process of the invention can be air. However, in order to avoid hazard, it is preferable to dilute air with an inert gas. At the preferred temperatures, the space in the reaction vessel above the liquid is saturated with acetic acid vapor. At a temperature of, for example, 125°C., a gas saturated with acetic acid vapor containing 15 volume per cent oxygen is inflammable. Therefore, in practicing this invention, it is preferred to dilute air with an inert gas such as nitrogen in order to insure that an inflammable or explosive mixture will not be obtained in the space above the liquid in the reaction vessel. In general, at least 2 per cent by volume of oxygen must be present in the gas in order for the process of the invention to proceed at a reasonable rate. Therefore, the broad range of oxygen concentrations in the gas that is recommended is from about 2 to about 14 volume per cent. The preferred range of oxygen is from about 5 to about 11 volume per cent. While any inert gas can be used as the diluent, it is usually preferred to use nitrogen for reasons of economy.

The amount of impurities in the acetic acid is small, so that the actual quantity of oxygen reacted with these impurities related to the total amount fed is inconsequential. A large excess is always used. This is particularly true when agitation is provided by the gas, but even when a mechanical stirrer is employed, it is still desirable to use relatively large volumes of gas. The operable limits would generally be from about 2 volumes of total oxygen-containing gas per volume of acid to 500 volumes or more of gas per volume of acid. The preferred range is from about 5 volumes of gas to about 100 volumes of gas per volume of acetic acid solution. These values apply to each reactor, so that in a system in which there are several reactors, the total oxygen-containing gas flow would be greater.

At temperatures below 117°C. (the boiling point of acetic acid), the process of the invention can be carried out at atmospheric pressure. However, above that temperature, superatmospheric pressures must be employed. There is an advantage in employing superatmospheric pressure in order to obtain improved dispersion and dissolution of oxygen in the acetic acid. There is no need to use excessively high pressure, although, except for expense, there is no disadvantage in doing so. A broad range for the pressure is from about atmospheric pressure to about 1000 psig, while the preferred operating range is from about 20 psig to about 100 psig.

The catalyst that is employed in the invention is a soluble compound of a transition metal. The catalysts that can be employed are soluble compounds of manganese, vanadium, cobalt, nickel, molybdenum, iron, tungsten and other variable-valence transition metals. By "transition metals" is meant the metals of Groups VB, VIB, VIIB and VIII of the Periodic Table, excluding the noble metals of Group VIII such as palladium and platinum. The metal compound employed is soluble in acetic acid, and may conveniently be added as the salt of the metal and an alkanoic acid, preferably, acetic acid. If desired, the metal may be introduced into the acetic acid in a form such as the oxide or the carbonate which is readily converted to the acetate in solution. Among the metals that can be employed, the manganese compounds are preferred. The catalyst is employed in a catalytically effective amount, such as from about 0.01 weight per cent of the total weight of acid to about 1 per cent or more. Preferably, the soluble metal compound is employed in an amount of from about 0.05 weight per cent to about 0.2 weight per cent, based upon the weight of the acid. The reactor that is employed in the process of the invention can be constructed of any metal that is resistant to hot acetic acid and oxygen at elevated temperature. Suitable materials include stainless steel, titanium, glass, "Hastelloy", "Inconel", and "Monel".

A convenient way of carrying out the process of the invention is to apply it to a semi-pure acetic acid which has not been subjected to a final distillation. In this way, after the material has been subjected to the process of the invention, it can be distilled. Any volatile compounds formed in the process by reaction with oxygen can thereby be removed as a forecut. A residue, which represents an appreciable amount of the material which is distilled, is actually a solution of the catalyst in acetic acid. This is very satisfactory for use in treating a fresh charge of acid. In this manner, the catalyst can continually be recycled with very little net loss of catalyst.

The main cut from this distillation is of very high quality, and is suitable for almost any commercial purpose for which acetic acid is employed.

The following examples illustrate various aspects of the invention. In the examples, all parts and percentages are by weight, unless otherwise indicated.

EXAMPLE 1

Treatment of Plant-Grade Acetic Without Catalyst - Batch Operation

The acetic acid used for the experiment was produced by hydrocarbon oxidation. It had been distilled one time. It contained about 110 ppm of methyl isopropenyl ketone and 20 ppm of methyl vinyl ketone and about 0.25 per cent formic acid. The permanganate time test of this material was zero.

A one-liter Pyrex flask was equipped with stirrer, gas sparger, reflux condenser and thermometer. To this there was charged 400 grams of the acid. It was heated to 117°C., and while it was stirred at a good rate, a gas mixture of 400 ml. per minute of air and 400 ml. per minute of nitrogen was fed to it. This was continued for 90 minutes.

The mixture was cooled and the acid was distilled at atmospheric pressure through a 40 plate Oldershaw Column. A forecut of 20 grams was collected at a reflux ratio of 10 to 1. A main fraction of 340 grams was collected at a reflux ratio of 1 to 1. It had a permanganate time test of only 15 seconds.

EXAMPLE 2

Treatment of Plant-Grade Acetic Acid with Catalyst Present - Batch Operation

To the apparatus described above, there was charged 346 grams of the same kind of semi-refined acetic acid in which 0.34 gram of manganese acetate was dissolved. This solution was heated to 117°C., and while it was stirred vigorously, 235 ml/minute of air and 235 ml/minute of nitrogen was passed through it for 60 minutes. The acid was distilled as before. A fore-cut of 17 grams was collected and a maincut of 301 grams was obtained. The permanganate time test of the latter was 4 hours.

EXAMPLE 3

Treatment of Plant-Grade Acetic Acid with Catalyst Present - Batch Operation - Long Reaction Time To the apparatus described in Example 1 there was charged 346 grams of the semi-refined acid which contained 0.1 weight per cent manganese acetate. It was heated to 117°C. and stirred vigorously while 148 ml. of air and 148 ml. of nitrogen were passed through it for 120 minutes. The liquid was cooled and distilled as in the previous examples. The main cut had a permanganate time test of 7 hours.

EXAMPLE 4

Treatment of Plant-Grade Acid - Batch Operation - Low Temperature - Short Reaction Time To the apparatus used in the preceeding Examples there was charged 476 grams of the semi-refined acid which contained 0.1 weight per cent manganese acetate. It was heated to 117°C., and while it was stirred vigorously 423 ml/minute of air was passed through it for 30 minutes. The liquid was cooled and distilled as in the other Examples. The main cut had a permanganate time test of only 10 seconds.

EXAMPLE 5

Treatment of Plant-Grade Acetic Acid in Continuous Apparatus

A run was made in a continuous apparatus in which the operation was conducted in three reactors in series. The reactors were tubes 30 inches long and 1 inch diameter. One was glass and the other two 304 stainless steel. Semirefined acid of the type described in Example 1 containing 0.1 weight per cent manganese acetate was fed to the top of the first reactor and was removed from the bottom, then passed to the top of the second and out the bottom to the top of the third reactor and finally was discharged from the bottom of that tube. Air and nitrogen were each fed to the bottom of each reactor at the rate of 13.6 ml per minute. The volume of acid in each reactor was 300 ml. The acid was fed at the rate of 900 ml. per hour so that the total residence time in the reactor was 60 minutes. The reaction temperature was maintained at 118°C. throughout the run.

The product was accumulated and distilled continuously through a 55 plate Oldershaw column with a pasteurizing section, a heads cut was removed at the top of the column which was 6.6 per cent by weight of the feed. A main cut, which was 90 per cent of the feed, was removed at the 45th tray. It had a permanganate time test of 2.5 hours.

EXAMPLES 6 thru 10

Treatment of Plant-Grade Acid In Continuous Apparatus at Elevated Pressure

The apparatus used for this series of experiments consisted of 3 stainless steel tubes 30 inches long and 1 inch diameter. They were operated in series, and the semirefined acetic acid described in Example 1 containing 0.1 weight per cent manganese acetate was fed to the system in a fashion similar to that in the preceeding Example so that the liquid was fed to the top of each reactor. Gas was admitted to the bottom of each tube. The total liquid capacity of the unit was 1050 ml.

In Table I, below, there is a summary of results from 5 runs in which temperature, contact time, gas flow, and oxygen content of gas was varied. The system was equipped with a pressure controller and all of the runs in the series were made at 30 psig. They were evaluated by a standard procedure in which approximately 800 grams of the product was distilled through a 40 plate Oldershaw column. After a 10 per cent heads cut a main cut of approximately 85 per cent was collected and the permanganate time test was run on it in every case.

TABLE I

CONTINUOUS TREATMENT OF PLANT-GRADE ACETIC ACID IN STAINLESS STEEL REACTORS AT 30 PSIG

| Example No. | Temperature, °C. | Total Contact Time In System | % $O_2$ In Gas | Ratio of Gas/Liquid Volumes, Each Reactor | Permanganate Time Test Of Distilled Product-Hours |
|---|---|---|---|---|---|
| 6 | 115 | 60 | 10 | 24.6 | 2¾ |
| 7 | 125 | 60 | 10 | 25.3 | 8 |
| 8 | 125 | 40 | 7 | 23 | 5 |
| 9 | 115 | 60 | 10 | 10 | 6 |
| 10 | 120 | 50 | 8.5 | 17 | 2¼ |

EXAMPLE 11

Treatment of Plant-Grade Acid Using Cobalt Acetate Catalyst - Batch Operation To the apparatus described in Example 1 there was charged 400 grams of the above-described semi-refined acetic acid in which 0.40 gram of cobaltous acetate was dissolved. This was heated to 117°C., and while it was stirred vigorously, 250 ml./minute of air and 250 ml./minute of nitrogen were sparged into it for 60 minutes. The acid was distilled in the usual way and, after a fore-cut of 24 grams was collected, a main cut of 321 grams was obtained. The permanganate time test of the main cut was 4½ hours.

EXAMPLE 12

Treatment of Plant-Grade Acetic Acid Using Ferric Acetate Catalyst

To the apparatus described in Example 1 there was charged 400 grams of the semi-refined acetic acid in which 0.60 gram of ferric acetate was dissolved. While the liquid was heated at 117°C. and stirred vigorously 300 ml./minute of air and 300 ml./minutes of nitrogen were sparged into it for 60 minutes. The acid was distilled and a forecut of 22 grams and a main cut of 305 grams were collected. The permanganate time test of the latter was 3 hours.

EXAMPLE 13

Treatment of Plant-Grade Acetic Acid Using Nickel Acetate Catalyst

To the apparatus described in Example 1 there was charged 400 grams of the semi-refined acid in which 0.40 grams of nickel (ous) acetate was dissolved. While the liquid was heated at 117°C. and stirred vigorously 300 ml./minute of air and 300 ml./minute of nitrogen were sparged into it for 60 minutes. The acid was distilled and a forecut of 25 grams and a main cut of 308 grams were collected. The permanganate time test was 3½ hours.

EXAMPLE 14

Treatment of Plant-Grade Acetic Acid Using Vanadium Catalyst

To the apparatus described in Example 1 there was charged 400 grams of the semi-refined acetic acid to which 0.60 gram of ammonium vanadate was added. The mixture was heated to 117°C. and stirred while 300 ml./minute of air and 300 ml./minutes of nitrogen were sparged into it. The acid was distilled and a heads cut of 25 grams and a main cut of 301 grams were collected. The permanganate time test of the latter was 2½ hours.

What is claimed is:

1. Process for the reduction in the content of oxidizable impurities in acetic acid produced by hydrocarbon oxidation, which process comprises contacting:
   a. acetic acid, in the liquid phase, wherein said acetic acid contains (i) oxidizable impurity comprising alpha, beta-olefinically unsaturated ketone, and (ii) a catalytically effective quantity of a soluble transition metal acetate, said transition metal being a metal of Group VB, VI B, VII B, or VIII of the Periodic Table, excluding the noble metals of Group VIII; with
   b. a gas containing molecular oxygen,
   at an elevated temperature within the range of from about 75° to about 150°C. and for a period of time sufficient to reduce the content of oxidizable impurities to a level wherein the acetic acid product of said process has a rating of at least 2 hours in the potassium permanganate time test.

2. The process of claim 1 wherein the transition metal acetate is an acetate of manganese, vanadium, cobalt, nickel, molybdenum, iron or tungsten.

3. The process of claim 2 wherein said process is carried out for a period of from about 20 minutes to about 90 minutes.

4. The process of claim 2 wherein the transition metal acetate is employed in an amount of from about 0.01 to about 1 weight per cent, based upon weight of acetic acid.

5. The process of claim 4 wherein the concentration of oxygen in said gas is from about 2 to about 14 volume per cent.

6. The process of claim 4 wherein said process is carried out for a period of from about 20 minutes to about 90 minutes.

7. The process of claim 2 wherein the concentration of oxygen in said gas is from about 2 to about 14 volume per cent.

8. The process of claim 7 wherein said process is carried out for a period of from about 20 minutes to about 90 minutes.

9. The process of claim 1 wherein the transition metal acetate is manganese acetate.

10. The process of claim 9 wherein the transition metal acetate is employed in an amount of from about 0.01 to about 1 weight per cent, based upon weight of acetic acid.

11. The process of claim 9 wherein the concentration of oxygen in said gas is from about 2 to about 14 volume per cent.

12. The process of claim 9 wherein said process is carried out for a period of from about 20 minutes to about 90 minutes.

13. The process of claim 1 wherein the transition metal acetate is employed in an amount of from about 0.01 to about 1 weight per cent, based upon weight of acetic acid.

14. The process of claim 1 wherein the concentration of oxygen in said gas is from about 2 to about 14 volume per cent.

15. The process of claim 1 wherein said process is carried out for a period of from about 20 minutes to about 90 minutes.

16. The process of claim 15 wherein the temperature is within the range of from about 110° to about 140°C.

17. The process of claim 16 wherein the process is carried out under super-atmospheric pressure.

* * * * *